US012625724B1

(12) United States Patent
Bays et al.

(10) Patent No.: US 12,625,724 B1
(45) Date of Patent: May 12, 2026

(54) PERSISTENT SCHEDULE EVALUATION AND ADAPTIVE RE-SCHEDULING

(71) Applicant: United States of America as represented by the Secretary of the Navy, Arlington, VA (US)

(72) Inventors: Matthew J Bays, Panama City, FL (US); Thomas A Wettergren, Newport, RI (US)

(73) Assignee: The United States of America as represented by the Secretary of the Navy

( * ) Notice: Subject to any disclaimer, the term of this patent is extended or adjusted under 35 U.S.C. 154(b) by 498 days.

(21) Appl. No.: 18/228,163

(22) Filed: Jul. 31, 2023

(51) Int. Cl.
*G06F 3/00* (2006.01)
*G06F 9/48* (2006.01)

(52) U.S. Cl.
CPC ............ *G06F 9/4831* (2013.01); *G06F 9/485* (2013.01)

(58) Field of Classification Search
CPC ........................................................ G06F 9/48
See application file for complete search history.

(56) References Cited

U.S. PATENT DOCUMENTS

| | | | | |
|---|---|---|---|---|
| 5,999,893 | A * | 12/1999 | Lynch, Jr. ............... | G06F 18/21 700/89 |
| 10,120,724 | B2 * | 11/2018 | Badjatia ................... | H04W 4/24 |
| 11,590,651 | B2 * | 2/2023 | Buerger ................... | B25J 9/163 |
| 2009/0191513 | A1 * | 7/2009 | Wang ..................... | G09B 9/052 434/69 |

| | | | | |
|---|---|---|---|---|
| 2015/0323989 | A1 * | 11/2015 | Bateman ................ | G06V 40/20 345/156 |
| 2017/0108236 | A1 * | 4/2017 | Guan ........................ | F24F 11/52 |
| 2018/0240032 | A1 * | 8/2018 | van Rooyen .......... | G16B 30/00 |
| 2019/0220827 | A1 * | 7/2019 | Cogill .............. | G06Q 10/06316 |
| 2020/0125586 | A1 * | 4/2020 | Rezaeian ................ | G06F 3/048 |
| 2020/0394553 | A1 * | 12/2020 | Yin .......................... | G06N 3/09 |
| 2021/0035563 | A1 * | 2/2021 | Cartwright ............. | G06N 3/084 |
| 2022/0293107 | A1 * | 9/2022 | Leaman ............. | G06Q 30/0271 |
| 2023/0010019 | A1 * | 1/2023 | Muthuswamy ........ | G06Q 10/04 |

FOREIGN PATENT DOCUMENTS

| | | | | |
|---|---|---|---|---|
| CN | 112465411 | B * | 6/2021 | ........... G06F 18/214 |

OTHER PUBLICATIONS

Abraham Lincoln, Hidden Markov Model. (Year: 2015).*

* cited by examiner

*Primary Examiner* — Lechi Truong

(74) *Attorney, Agent, or Firm* — James M. Kasischke; Jeffry C. Severson

(57) ABSTRACT

Methods and systems are provided for dynamic evaluation and elastic re-planning for a variant of the flexible job-shop scheduling problem, wherein a set of jobs have been pre-allocated to a set of machines for performing the various subtasks for the jobs. The machines are allocated the tasks under a pre-defined but estimated schedule based on initial knowledge of the jobs and desired outcome. However, due to a level of autonomy and reactivity to job characteristics (such as material imperfections, environment, or job difficulty), the precise duration and actions individual machines will require to accomplish the tasks is unknown a priori. A Hidden Markov Model is developed for propagating task estimates. A quadratic-programming-based elastic re-scheduling algorithm is formulated, which quickly and efficiently re-plans overall job schedules.

18 Claims, 4 Drawing Sheets

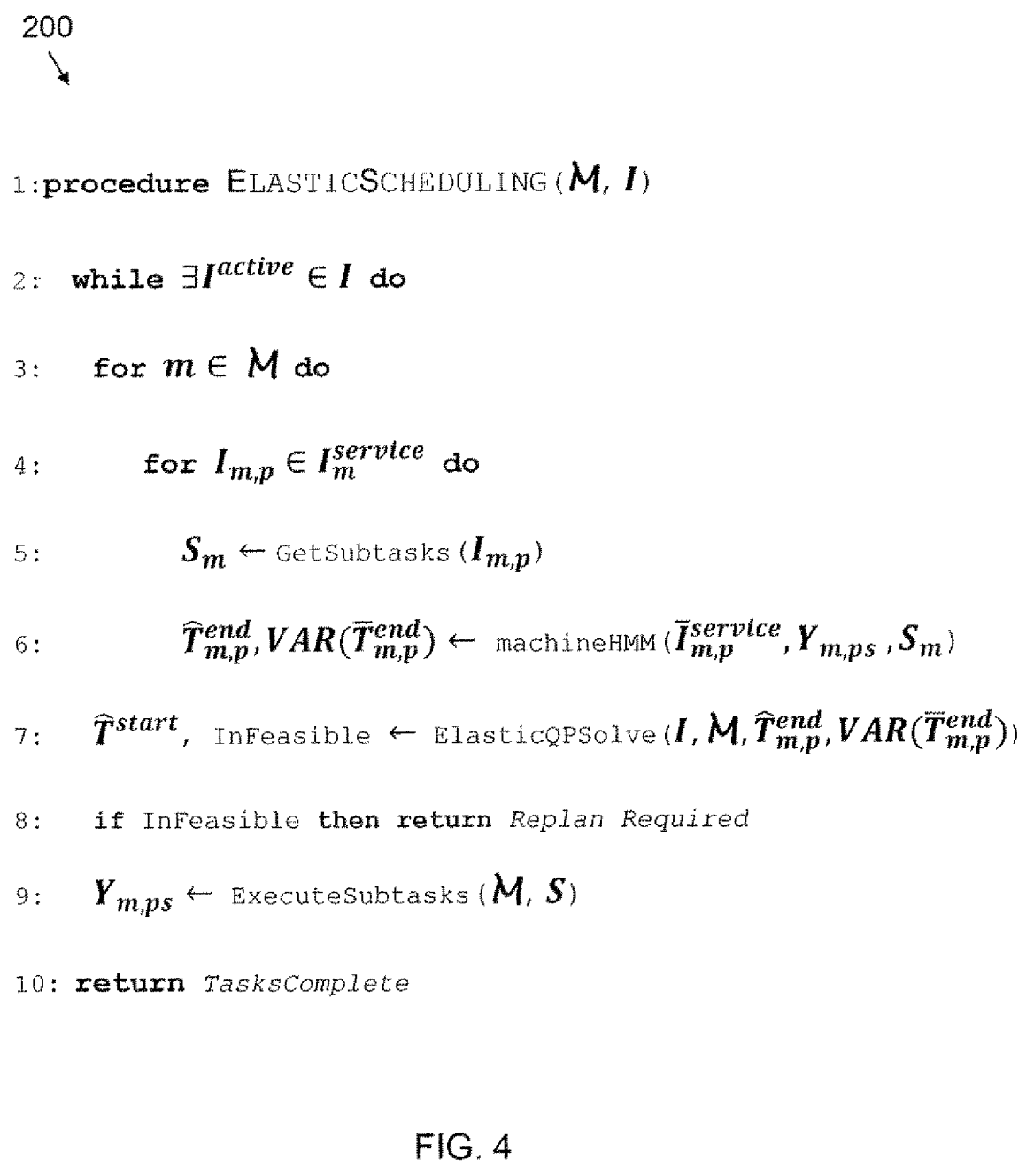

200

1:procedure ELASTICSCHEDULING($M$, $I$)

2:  while $\exists I^{active} \in I$ do

3:    for $m \in M$ do

4:      for $I_{m,p} \in I_m^{service}$ do

5:        $S_m \leftarrow$ GetSubtasks($I_{m,p}$)

6:        $\hat{T}_{m,p}^{end}, VAR(\bar{T}_{m,p}^{end}) \leftarrow$ machineHMM($\bar{I}_{m,p}^{service}, Y_{m,ps}, S_m$)

7:    $\hat{T}^{start}$, InFeasible $\leftarrow$ ElasticQPSolve($I, M, \hat{T}_{m,p}^{end}, VAR(\tilde{T}_{m,p}^{end})$)

8:    if InFeasible then return *Replan Required*

9:    $Y_{m,ps} \leftarrow$ ExecuteSubtasks($M, S$)

10: return *TasksComplete*

FIG. 4

PERSISTENT SCHEDULE EVALUATION AND ADAPTIVE RE-SCHEDULING

STATEMENT OF GOVERNMENT INTEREST

The invention described herein may be manufactured and used by or for the Government of the United States of America for governmental purposes without the payment of any royalties.

BACKGROUND OF THE INVENTION

(1) Field of the Invention

The present invention relates to evaluating and re-planning of job schedules for a set of machines performing the various subtasks for the job. More particularly, the present invention relates to a model developed for propagating task estimates, with an elastic re-scheduling algorithm to quickly and efficiently re-plan overall job schedules.

(2) Description of the Prior Art

The flexible job-shop scheduling problem (FJSP) is a classic problem in operations research, where a number of work centers consisting of identical machines are available to process a set of jobs. Each job must visit each work center, but any machine at the work center may process the job. The goal of the optimization problem is to develop an assignment of operations to machines, along with a corresponding schedule, such that some function of the assigned costs is minimized.

Very often this objective is phrased as minimizing the makespan, which is given as the final completion time for the last completed operation. The makespan for the entire set of assigned jobs schedules the time for completion of the last-completed job. While the complete optimization problem has been extensively studied, less studied has been how to efficiently estimate and re-plan an initial job-shop schedule when the precise time required for the various tasks is unknown beforehand.

In the late 1980's it was recognized that FJSP was a computationally hard problem and most efforts attempted to solve it as a special case of a Traveling Salesperson Problem (TSP). In the early 1990's the focus became on trying to use more modern computational optimization methods (like metaheuristics) but there was always difficulty maintaining a direct connection from the symbolic optimization solution to the actual schedule because some of the "production rules" were often violated (such as precedence constraints).

Early on, it was shown that clever representations of the chromosomes of genetic algorithms could be developed that were consistent with FJSP formulations. This led to a natural way to enforce production rules of the FJSP within the optimization procedure. Similarly, it was shown that local solutions to a job shop scheduling problem can be found using simulated annealing (when given enough time to converge). More recent work in this area is based on advanced numerical solutions to the problem.

Recently, there have been other metaheuristic approaches proposed for solving FJSP's, including tabu search algorithms, particle swarm optimization (PSO), and even using Lagrangian relaxation methods to reformulate the original Mixed-Integer Linear Programming (MILP) problem as a pure Linear Programming (LP) problem. All of these approaches can be applied to the re-scheduling problem, but they effectively optimize the main problem again without directly solving it as an adaptation of the existing plan.

Multiple objective variants of flexible job shop scheduling problems have also recently appeared in the literature. There has been developed a multi-objective metaheuristic solution approach for the FJSP problem. This approach allows an operator to choose operating points along a Pareto front and modify the schedule in response to desired changes in the objective preferences. Also, a particle swarm optimization (PSO) approach has been used to solve a multi-objective version of FJSP.

Some of the applications involve modifying the formulation for application-specific needs or developing a new objective function. It has been shown that multiple robotic arms can be coordinated to execute multiple tasks by performing the scheduling using a genetic algorithm. In this case all of the complexity is taken into the genetic chromosome and it becomes a standard genetic algorithm problem.

Some have looked at the tardiness objective as an interesting objective for FJSP problems, where tardiness is defined as how late tasks are behind a due date (as opposed to getting done as soon as possible). In this approach there are new heuristics for local solutions to the problem, given an initial schedule, which is an alternative approach to re-scheduling that doesn't take advantage of the computational benefits of the elastic approach.

The direct application of adaptive approaches that do not involve an adaptive solution of the original scheduling optimization problem have been limited. One recent approach adapts the scheduling of search-and-rescue vehicles by prioritizing the objective of maximizing the number of allocated tasks in a fixed amount of time over more direct objectives. Another recent example of re-scheduling looks at the impact of machine disruption on schedule adaptation. A genetic algorithm is used to solve the schedule adaptation and compare their results to two heuristics, a right-shifting scheduler which simply moves every task forward and a pre-scheduler that accounts for projected downtime.

Hidden Markov models have historically been used in traditional machine learning (ML) applications for linguistics, speech recognition, and pose estimation. Schedule adaptation has been studied previously for learning optimal policies to admit new jobs to the machine queue. The concept of using elasticity as a means to determine how to adjust schedules under changing conditions has been proposed. However, the work relies on the periodicity of tasks to determine the variation from one machine cycle to the next.

Prior work in asset scheduling and task allocation has largely involved planning based on pre-defined capabilities and estimated duration of all tasks. Some have attempted to preemptively handle uncertainty in task duration using probabilistic models and formal risk metrics. Others have attempted to handle discrete schedule interruption events such as asset inter-operability by minimizing deviations from the original plan. However, research into scheduling and task re-allocation techniques that persistently evaluate the performance of machines to determine if and when re-allocation and re-scheduling should occur, or how to adapt current plans to gradual changes in performance has been limited.

Thus, there exists a need to fill this gap by developing a novel theory and algorithms for determining when and how to re-plan and re-task machines that have some degree of autonomy in the face of constantly changing conditions. Additionally, a hidden Markov model (HMM) should be used to learn the delays that occur in the planned schedule. Further, the above-mentioned ideas need to be generalized to the scenario where tasks are not periodic. Elasticity needs to be used to determine a reconfiguration of the timing of tasks in the job queue based on their expected HMM estimate.

SUMMARY OF THE INVENTION

It is therefore a general purpose and primary object of the present invention to provide methods and systems for dynamic evaluation and elastic re-planning for a variant of the flexible job-shop scheduling problem. A Hidden Markov Model propagates task estimates, with a quadratic-programming-based elastic re-scheduling algorithm to quickly and efficiently re-plan overall job schedules.

The methods and systems may evaluate and replan schedules for a set of machines that have been allocated tasks under a pre-defined but estimated schedule based on initial knowledge of the jobs and desired outcome. As tasks are being completed, various machines within the set may experience delays adversely impacting the estimated schedule.

A Hidden Markov Model (HMM) is developed to describe the evolution of observable schedule delays that depend on internal factors, such as material imperfections, environment, or job difficulty, which are not directly observable. This Hidden Markov Model can then be used to propagate updated task estimates based on then-current data for each task. A quadratic-programming-based elastic re-scheduling algorithm utilizes the updated estimates to quickly and efficiently re-plan overall job schedules.

The methods and systems first define a set of machines that are each to execute a defined list of tasks, with each task belonging to a finite set of task types (fixed, flexible, or production). Each task has initially planned and defined start and end times. Fixed tasks have a start time that must be executed at the planned start time. Flexible tasks may have a variable start time. Each production task may be divided into a finite number of subtasks that may be executed in a finite number of modes based on the sensed characteristics of the area where the task is executed.

Using the above definitions, formal estimates of the mean and variance of the end time can be developed using calculations for the expectation of the in-situ end time for each job and a calculation for the transient variance of the end time. The mean end time is conditioned on the predicted end time and the previously sensed or detected environment of the system. The running mean expected end time while executing a particular subtask takes into consideration the posterior probability of a subtask having a particular sensed environment, or job difficulty state.

The likelihood value of the job difficulty state is propagated using the belief state of the previous in-situ job difficulty state and the prior knowledge of the overall job difficulty for the given subtask. Letting there exist a one-to-one mapping of each job difficulty prior to the in-situ job difficulty state, a representation of the dependencies can be shown by a Bayes network. From this belief network, individual priors and conditional probability density functions may be realized.

From the conditional probability density functions, the conditional probability of the next in-situ job difficulty state can be obtained recursively. Using this recursion, it is possible to develop a predictive model for the probability of the next observation which is then used to determine the course of action at the subtask.

The variance calculation for the final endtime is also inherently conditioned on the sensed characteristics of the area where the task is executed and the job difficulty state prior. Variables are defined to normalize around the expected mean value of the end time of all future tasks. Determining the variance and covariance of the resulting summation allows the computation of the joint expectation for any two job difficulty parameters. Combining these with the properties of transient Markov chains known in the prior art allows for the final determination for the covariance and variance of the final endtime.

Using the above estimates for the expected endtime and uncertainty of production tasks, a continuous re-planning of the scheduled can be developed by defining cross-scheduled tasks, loosely connected tasks, coupled tasks and adjacent tasks. Cross-scheduled tasks have direct effects on different machines in the job. Tasks are defined as loosely connected if there is a set of precedence constraints that connect them. Coupled tasks are those whose corresponding relative start times and precedence must always remain the same within the schedule. Finally, tasks are adjacent if there exist implicit constraints that the start time for a next task is equal to the endtime of the previous task.

A quadratic programming approach can be used to combine a number of production tasks into an optimally delayed end-to-end schedule based on the constraints inherent in the above definitions plus constraints defining a cost function to be minimized and the elasticity weights. The goal of the minimization is to weight the perturbation of future tasks in an optimal manner to minimize the overall difference between the new schedule and the original schedule while respecting schedule constraints. The resulting quadratic program can be solved in polynomial time. A full iterative elastic scheduler combining the polynomial-time solvable quadratic program with the hidden Markov Model for task completion time estimation can be developed.

In one embodiment, a method evaluates and replans schedules for a set, M, of machines that have been allocated tasks under a pre-defined but estimated original schedule based on initial knowledge of the tasks and desired outcome. The method includes developing a Hidden Markov Model (HMM) describing the evolution of observable schedule delays dependent on factors not directly observable. The method further includes propagating updated task estimates for each task based on using the HMM and then-current data and applying a quadratic programming (QP) approach to combine the updated task estimates into an optimally delayed end-to-end schedule.

In propagating the updated task estimates, the method obtains start times and endtimes for fixed task types, flexible task types and production task types. Each fixed task type maintains an original schedule start time and endtime. A duration of each flexible task type is a constant and a start time of each flexible task type is dependent on an endtime of a preceding task. Each production task type is divided into a finite number of subtasks and each of the subtasks is executed in one of a finite number of modes based on sensed characteristics of an area wherein each subtask is executed.

In developing the HMM, the method develops a first calculation for the expectation of the mean endtime for each production task, $$\hat{T}^{end}_{m,p}(s),$$

where m is an index of an $m^{th}$ machine in the set of machines, p is an index of a $p^{th}$ task of the $m^{th}$ machine, and s is an index of a $s^{th}$ subtask of said $p^{th}$ task. The method further develops a second calculation for the transient variance of each executed endtime of each of the production tasks, $$VAR(\overline{T}_{m,p}^{end}).$$

The quadratic programming approach includes developing an ontology describing relative interactions between tasks. Additionally, the QP approach includes minimizing an overall difference between a replanned schedule and the original schedule by weighting a perturbation of future tasks, while respecting constraints inherent in the ontology.

The interactions include interactions with the fixed tasks, wherein the fixed tasks are constrained to maintain an original schedule start time during replanning. Further included are interactions with cross-scheduled tasks, wherein the cross-scheduled tasks are constrained to have a same start time and a same end time and interactions with loosely connected tasks, wherein there exist implicit constraints that a start time of a first of the loosely connected tasks is at least one of before and equal to a start time of a second one of the loosely connected tasks.

Additional interactions include interactions with coupled tasks, wherein corresponding relative start times and precedence remain the same within a schedule and interactions with adjacent tasks, wherein there exist implicit constraints a start time of a following one of the adjacent tasks is an end time of a preceding one of the adjacent tasks. The QP approach also includes constraining the executed endtimes of the production tasks to occur at a current expected production time based on the first and second calculations for the production tasks.

In one embodiment, a method updates schedules for a set of machines, M, that have been allocated tasks under a pre-defined but estimated original schedule. The method includes obtaining an updated task completion estimated endtime for each of the tasks, defining constraints on interactions between the tasks and applying a quadratic programming (QP) approach to combine the updated task completion estimates and the constraints into an optimally delayed end-to-end schedule.

Applying the QP approach includes applying elasticity parameters to the updated task completion estimates and optimally weighting a perturbation of future tasks based on the elasticity parameters. The weighting includes obtaining a transient variance of each said estimated endtime, $$VAR\big(T_{m,p}^{end}(s)\big),$$

where m is an index of an $m^{th}$ machine in said set of machines, p is an index of a $p^{th}$ task of a set P tasks of said $m^{th}$ machine, and S is an index of a $s^{th}$ subtask of said $p^{th}$ task.

The constraints include enforcing precedence between task schedules, enforcing fixed tasks be scheduled at start times consistent with the original schedule and enforcing cross-scheduled tasks be scheduled with a same start time and a same end time. In obtaining an updated task completion estimated endtime, the method also includes obtaining production task start times and endtimes. Each production task is divided into a finite number of subtasks and each of the subtasks is executed in one of a finite number of modes based on sensed characteristics of an area wherein each subtask is executed. Further, the constraints include enforcing endtimes of production tasks occur at a current expected production time based on the updated task estimates for the production tasks.

The optimally delayed schedule minimizes a cost function $$\sum_{m \in M, p \in P_m} k_{m,p} \big| \big( T_{m,p+1}^{start} - T_{m,p}^{end} \big) - \big( \overline{T}_{m,p+1}^{start} - \overline{T}_{m,p}^{end} \big) \big|^2,$$

wherein $k_{m,p}$ is a summation of the transient variances over the set P, $$T_{m,p+1}^{start}$$

signifies an original start time of a task, p+1 of machine m, $$T_{m,p}^{end}$$

signifies an original end time of a task, p of machine m, $$\overline{T}_{m,p+1}^{start}$$

signifies an expected start time of task p+1 and $$\overline{T}_{m,p}^{end}$$

signifies an expected end time of task p.

The method further includes determining if the optimally delayed end-to-end schedule is found to be infeasible in view of the constraints. If the end-to-end schedule is found to be infeasible, the method returns to replan the updated task schedules.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein:

FIG. 4 illustrates a pseudo code representation of the block diagram of FIG. 3.

DESCRIPTION OF THE INVENTION

Figure 1:
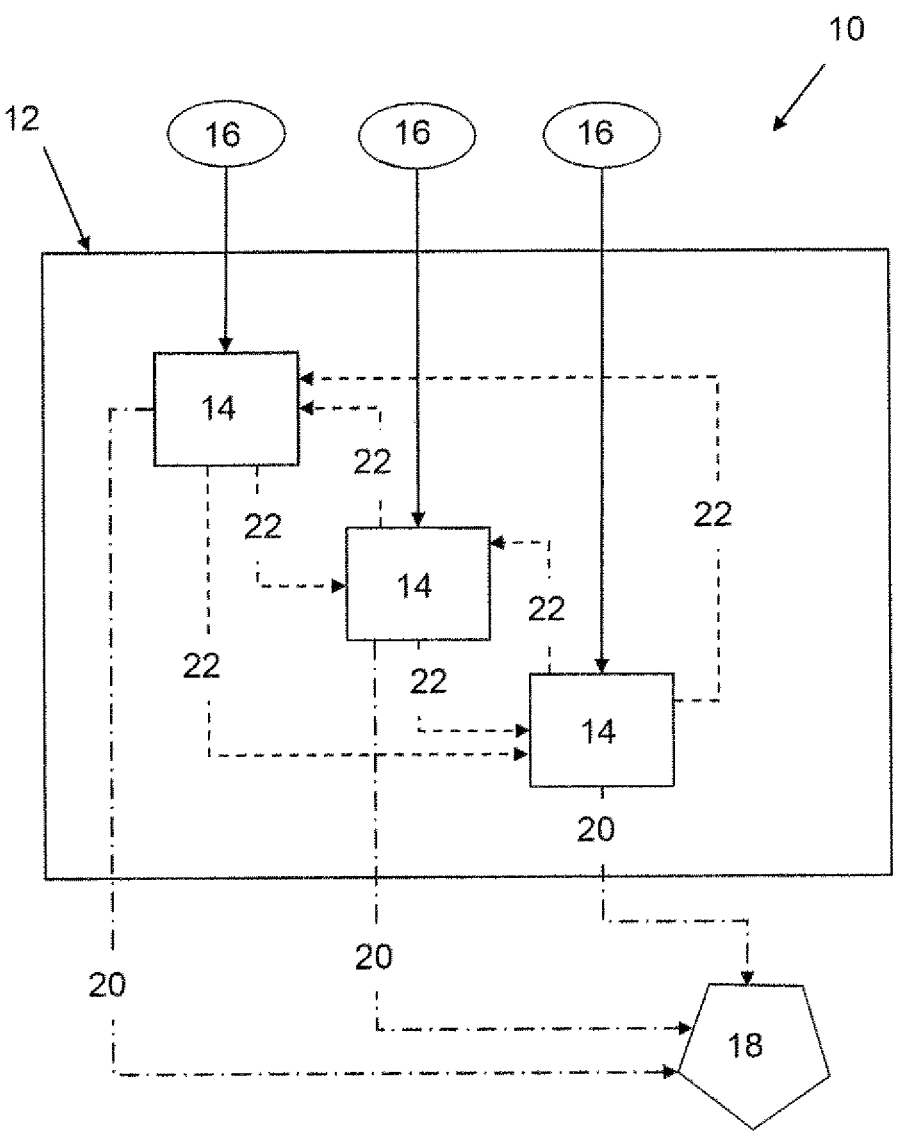
FIG. 1 is a simplified illustration of the Flexible Job-shop Scheduling Problem (FJSP)

Referring now to FIG. 1, there is shown a simplified illustration 10 of the Flexible Job-shop Scheduling Problem (FJSP). A job-shop 12 consists of a number of machines 14 that each execute defined tasks on a number of raw goods 16 to complete a final product 18. In addition to the outputs of machines 14 going to complete product 18 (shown by dash-dot arrows 20), each machine 14 may output a partial product for further processing at the other machines 14 in job-shop 12 (shown by dashed arrows 22). The FJSP is to schedule the tasks of each machine 14 for the most efficient and timely completion of product 18.

As in any process scheduling scenario, delays may occur at any stage of the process. These delays may require rescheduling at other stages of the process. The following description develops (through an initial mathematical framework) a theory and method for determining when and how to re-plan and re-task machines that have some degree of autonomy in the face of constantly changing conditions.

Let there exist a set of machines $M=\{1, \ldots, M\}$ that are each to execute a defined list of tasks $I_m=\{I_{m,1}, \ldots, I_{m,P_m}\}$, where m is the index of the $m^{th}$ machine in this set. For this formulation, each task belongs to one of a finite set of task types $k=\in\{\text{fixed, flexible, production}\}$. Each task type has certain characteristics as to their duration and variability of actual execution time as compared to planned execution schedule. It is denoted that $I_{m,p}$ is of type k as $I_{m,p}\in I^k$ or $$I_{m,p}^k$$

for brevity.

Each task is initially planned with a defined start time $$T_{m,p}^{start} \in \mathbb{R}$$

and end time $$T_{m,p}^{end} \in \mathbb{R}.$$

It is assumed the final, executed start and end times $$\overline{T}_{m,p}^{start} \text{ and } \overline{T}_{m,p}^{end}$$

must have the same precedence as the planned start times. As such, the final, executed start times are notated with over-bars $$(\overline{T}_{m,p}^{start}).$$

Additionally, the executed start times are related to the planned start time in a manner dependent on their particular task type. Fixed tasks are tasks such that the start time must be executed at the planned start time, i.e., $$\forall\, m \in M\ I_{m,p} \in I^{fixed} \Rightarrow \overline{T}_{m,p}^{start} = T_{m,p}^{start}. \tag{1}$$

Fixed tasked also have a fixed end time such that $$\forall\, m \in M\ I_{m,p} \in I^{fixed} \Rightarrow \overline{T}_{m,p}^{end} = T_{m,p}^{end}. \tag{2}$$

Flexible tasks are tasks that may have a variable start time, and thus have an end time that is given by $$T_{m,p}^{end} = T_{m,p}^{start} + T_{m,p}^{flex}, \tag{3}$$

where $$T_{m,p}^{flex}$$

is a constant that represents the duration of the task. The start time of each flexible task is dependent on the end time of the preceding task of machine m.

Let each production task be divided into a finite number of subtasks such that $$I_{m,p}^{prod} = \{I_{m,p,1}^{prod}, \ldots, I_{m,p,S_p}^{prod}\}. \tag{4}$$

Each subtask $$I_{m,p,s}^{prod}$$

may be executed in a finite number of modes based on sensed environment $y_s$. The instantiation of $y_s$ is determined by the discrete random variable $Y_s$, $Y_s\in 1, \ldots, M$, which represents the sensed characteristics of the area in which task S is executed. These characteristics may be both physical and/or operational features that affect the execution of the task. The end time of the subtask is then:

$$\overline{T}_{m,p,s}^{end} = \overline{T}_{m,p,s}^{start} + T^{prod}(y_s). \tag{5}$$

Assuming $$\overline{T}_{m,p}^{start} = \overline{T}_{m,p}^{end}, $$

we have $$I_{m,p} \in I^{fixed} \Rightarrow \overline{T}_{m,p}^{end} = T_{m,p}^{end}\forall\, m \in M. \tag{6}$$

Given the above model of machine task schedules, formal estimates of the mean $$E(\overline{T}_{m,p}^{start}) = \hat{T}_{m,p}^{end}$$

9 and variance $$VAR(\overline{T}_{m,p}^{end})$$

of each production task are developed as a first step of developing an adaptive scheduling methodology. This is done by developing both a calculation for the expectation of the in-situ endtime for each job and a calculation for the transient variance of the end time.

To develop an expected value of $$\overline{T}_{m,p}^{end},$$

the formal definition of expectation is applied to equation (5) to obtain $$E(\overline{T}_{m,p}^{end}) = E\left(\overline{T}_{m,p}^{start} + \sum_{s=1}^{S_p} T^{prod}(Y_s)\right) \qquad (7)$$

$$= \overline{T}_{m,p}^{start} + \sum_{s=1}^{S_p} E(T^{prod}(Y_s)). \qquad (8)$$

Note that $$\hat{T}_{m,p}^{end}$$

is conditioned on the predicted environment, as well as the previously sensed environment of the system. Although the formal conditioning is used within the development of the posterior in the derivation of the expected end time calculation, the conditioning is removed from the notation for clarity of the exposition.

Now a running estimation of the value of $$\hat{T}_{m,p}^{end}$$

while executing subtask s, denoted $$\hat{T}_{m,p}^{end}(s),$$

is explained by exploiting the fact that the particular mode executed at each individual subtask from s'=1, . . . , s is separable from the expectation. Thus, the running mean expected endtime takes the form:

$$\hat{T}_{m,p}^{end}(s) = \qquad (9)$$

$$\overline{T}_{m,p}^{start} + \sum_{s'=1}^{s} T^{prod}(y_{s'}) + \sum_{s''=s+1}^{S_p} \sum_{y_{s''} \in Y_{s''}} T^{prod}(y_{s''})P(Y_{s''} = y_{s''}),$$

where $P(Y_{s'}=y_{s''})$ is the posterior probability of task s" having a particular sensed or detected environment.

The posterior probability for each detection type, $P(y_s)$, is developed by first developing a model under which the detection events occur from the standpoint of the autonomous machine executing the subtasks. Assume the posterior probability of detection event $y_s$ for subtask s is determined directly by the actual environment under which subtask s occurs. This particular state is now labeled as the job difficulty state, represented by the random variable $B_s$. The likelihood value of $B_s$ is propagated using two factors: the belief state of the previous in-situ job state, $B_{S-1}$, and the prior knowledge of the overall job difficulty for the given subtask S, represented by the random variable $E_s$. We term $E_s$ the job difficulty state prior.

Figure 2:
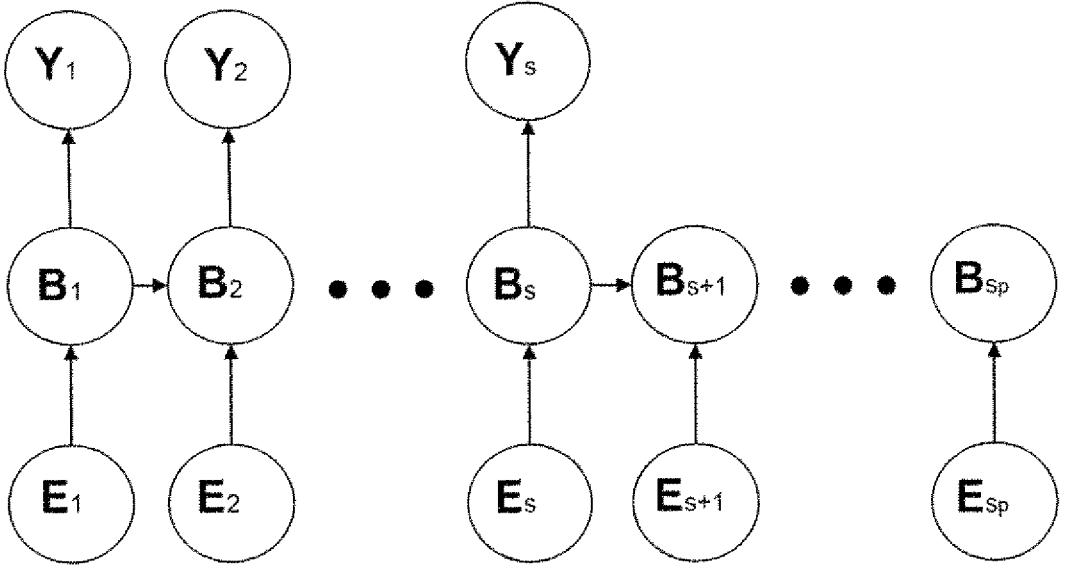
FIG. 2 illustrates a Bayes network representation of job difficulty dependencies.

Referring now to FIG. 2, there is shown an illustration of a Bayesian network representation of the dependencies of $Y_s$, $B_s$ and $E_s$. As with the action modes of the autonomous machines, let there exist a one-to-one mapping of $B_s=|Val(B_s)|$ to $Y_s$, and there exists a one-to-one mapping of each job difficulty prior $E_s$ to in-situ job difficulty state $B_s$. As seen in FIG. 2, each in-situ job difficulty state $B_s$ is dependent on the previous in-situ job difficulty state, as well as the job difficulty prior $E_s$. The Bayes network in FIG. 2 contains several characteristics that are intuitive from the standpoint of standard detection theory, while additionally containing useful extensions from a schedule estimation standpoint.

Firstly, all sensing events are not directly dependent on each other. Additionally, there exists prior job difficulty information contained in the job difficulty prior $E_s$ for each subtask. However, the overall flow of belief states propagates in the future. This model is chosen under the intuition that upon detecting an event at one location, it is likely to continue detecting that event at the immediate location in the future. However, the weight of the previous detection events will revert to the prior the further in the future the estimate is propagated.

From the belief network, individual priors and conditional probability density functions (CPDs) may be realized. Let $P(E_s)$ be the prior distribution of $E_s$. Let $P(B_s|E_s,B_{s-1})$ be the joint conditional probability distribution based on both $E_s$ and the previous true state $B_{s-1}$. Let $P(Y_s|B_s)$ be the conditional probability distribution of sensed environment conditioned on the in-situ job difficulty. From the CPDs, the conditional probability of the next in-situ job difficulty state can be obtained recursively.

Define the parameter $\alpha_s\beta_s$ according to the following:

$$\alpha_s\beta_s = P(B_s|Y_{1:s-1},E_{1:s})$$

$$= \Sigma_{B_{s-1}} P(B_s|B_{s-1},Y_{1:s-1},E_{1:s})P(B_{s-1}|Y_{1:s-1},E_{1:s})$$

$$\Sigma_{B_{s-1}} P(B_s|B_{s-1},E_s)\alpha_{s-1}(B_{s-1}). \qquad (10)$$

Using this recursion, it is possible to develop a predictive model for the probability of the next observation which is then used to determine the course of action at subtask s. Thus, $$P(Y_s|Y_{1:s-1},E_{1:s}) = \Sigma_{B_s} P(Y_s|B_s,Y_{1:s-1},E_{1:s})P(B_s|Y_{1:s-1},E_{1:s})$$

$$= Z_{B_s}[P(Y_s|B_s,Y_{1:s-1},E_{1:s})\Sigma B_{s-1} P(B_s|B_{s-1},Y_{1:s-1},E_{1:s})P(B_{s-1}|Y_{1:s-1},E_{1:s})] \qquad (11)$$

$$= \Sigma_{B_s}[P(Y_s|B_s)\Sigma_{B_{s-1}} P(B_s|B_{s-1},E_s)\alpha_{s-1}(B_{s-1})]$$

$$= \Sigma_{B_s} P(Y_s|B_s)\alpha_s)(B_s) \qquad (12)$$

Using equation (11), the value of $$\hat{T}_{m,p}^{end}(s)$$

in equation (9) is given by:

$$\hat{T}_{m,p}^{end}(s) = \tag{13}$$

$$\overline{T}_{m,p}^{start} + \sum_{s'=1}^{s} T^{prod}(y_{s'}) + \sum_{s''=s+1}^{S_p} \left[ \sum_{y_{s''} \in Y_{s''}} \left[ T^{prod}(y_{s''}) \sum_{B_{s''}} \right. \right.$$

$$P(Y_{s''} = y_{s''} \mid B_{s''}) \times \left[ \sum_{B_{s''-1}} P(B_{s''} \mid B_{s''-1}, E_{s''}) \alpha_{s-1}(B_{s''-1}) \right] \right] =$$

$$\overline{T}_{m,p}^{start} + \sum_{s'=1}^{s} T^{prod}(y_{s'}) + \sum_{s''=s+1}^{S_p} \left[ \sum_{y_{s''} \in Y_{s''}} \right.$$

$$\left. \left[ T^{prod}(y_{s''}) \sum_{B_{s''}} P(Y_{s''} = y_{s''} \mid B_{s''}) \alpha(B_{s''}) \right] \right]$$

The calculation for $$VAR(\overline{T}_{m,p}^{end}),$$

which is also inherently conditioned on to $Y_{1:s}$ and $E_{1:s_p}$, can now be derived. To simplify the derivation, new variables, $$\hat{T}_{m,p}^{end'}(s) \text{ and } \overline{T}_{m,p}^{end'},$$

can be defined with the relation $$\hat{T}_{m,p}^{end}(s) = E\left( \overline{T}_{m,p}^{end'}(s) \right) \tag{14}$$

$$+ \sum_{s''=s+1}^{S_p} \left[ \sum_{y_{s''} \in Y_{s''}} \left[ T^{prod}(y_{s''}) \sum_{B_{s''}} P(Y_{s''} = y_{s''} \mid B_{s''}) \times \tag{15} \right. \right.$$

$$\left. \left[ \sum_{B_{s''-1}} P(B_{s''} \mid B_{s''-1}, E_{s''}) \alpha_{s-1}(B_{s-1}) \right] \right] =$$

$$\sum_{s''=s+1}^{S_p} \left[ \sum_{y_{s''} \in Y_{s''}} \left[ T^{prod}(y_{s''}) \sum_{B_{s''}} P(Y_{s''} = y_{s''} \mid B_{s''}) \alpha(B_{s''}) \right] \right]$$

To normalize around the expected mean value of all of the future tasks.

Since the terms $$\overline{T}_{m,p}^{start} + \sum_{s'=1}^{s} T^{prod}(y_{s'}) \text{ within } \hat{T}_{m,p}^{end}$$

are constant, they do not change the variance. As previously shown in the art, the variance of the summation is given as $$VAR\left( \overline{T}_{m,p}^{end}(s) \right) = \tag{16}$$

$$\sum_{s'=s+1}^{S_p} VAR\left( T^{prod}(Y_{s'}) \right) + 2 \sum_{s+1 \le s' < s''}^{S_p} COV\left( T^{prod}(Y_{s'}), T^{prod}(Y_{s''}) \right).$$

From the definition of covariance, we have $$COV(T^{prod}(Y_{s'}), T^{prod}(Y_{s''})) = E(T^{prod}(Y_{s'}) T^{prod}(Y_{s''})) - \hat{T}^{prod}(Y_{s'}), \hat{T}^{prod}(Y_{s''}), \text{ where} \tag{17}$$

$$\hat{T}^{prod}(Y_{s'}) = \Sigma_{y_{s'} \in Y_{s'}} T^{prod}(y_{s'}) \Sigma_{B_{s'}} P(Y_{s'} = y_{s'}, B_{s'}) \alpha(B_{s'}) \text{ and} \tag{18}$$

$$\hat{T}^{prod}(Y_{s''}) = \Sigma_{y_{s''} \in Y_{s''}} T^{prod}(y_{s''}) \Sigma_{B_{s''}} P(Y_{s''} = y_{s''} \mid B_{s''}) \alpha(B_{s''}) \tag{19}$$

for measured job difficulty variables $Y_{s'}$ and $Y_{s''}$.

This allows the computation of the joint expectation $E(T^{prod}(Y_{s'}) T^{prod}(Y_{s''}))$ for any two job difficulty parameters $Y_{s'}$ and $Y_{s''}$. Specifically, the joint expectation is given by $$E\left( T^{prod}(Y_{s'}) T^{prod}(Y_{s''}) \right) = \tag{20}$$

$$\sum_{\substack{y_{s'} \in Y_{s'} \\ y_{s''} \in Y_{s''}}} T(y_{s'}) T(y_{s''}) P(Y_{s'} = y_{s'}, Y_{s''} = y_{s''} \mid E_{1:s}, Y_{1:s}) =$$

$$\sum_{\substack{y_{s'} \in Y_{s'} \\ y_{s''} \in Y_{s''}}} T(y_{s'}) T(y_{s''}) \sum_{B_{s'}, B_{s''}} P(y_{s'}, y_{s''} \mid B_{s'}, B_{s''}, E_{1:s}, Y_{1:s})$$

$$P(B_{s'}, B_{s''} \mid E_{1:s}, Y_{1:s}) = \sum_{\substack{y_{s'} \in Y_{s'} \\ y_{s''} \in Y_{s''}}} T(y_{s'}) T(y_{s''})$$

$$\sum_{B_{s'}, B_{s''}} [P(y_{s'} \mid B_{s'}, E_{1:s}, Y_{1:s}) P(y_{s''} \mid B_{s''}, E_{1:s}, Y_{1:s}) \times$$

$$P(B_{s'}, B_{s''} \mid E_{1:s}, Y_{1:s})] = \sum_{\substack{y_{s'} \in Y_{s'} \\ y_{s''} \in Y_{s''}}} T(y_{s'}) T(y_{s''})$$

$$\sum_{B_{s'}, B_{s''}} [P(y_{s'}, y_{s''} \mid B_{s'}) P(y_{s''} \mid B_{s''}) P(B_{s'}, B_{s''} \mid E_{1:s}, Y_{1:s}).$$

Combining equations (18), (19) and (20) with the properties of transient Markov chains as found in the art, the covariance is then $$COV\left( T^{prod}(Y_{s'}), T^{prod}(Y_{s''}) \right) = \tag{21}$$

$$\sum_{\substack{y_{s'} \in Y_{s'} \\ y_{s''} \in Y_{s''}}} \sum_{\substack{B_{s'} \\ B_{s''}}} T(y_{s'}) T(y_{s''}) P(Y_{s'} = y_{s'}, Y_{s''} = y_{s''} \mid E_{1:s}, Y_{1:s}) \times$$

$$\left[ \sum_{\substack{B_{s'} \\ B_{s''}}} \gamma_{b_{s'}}^{s'} \left[ \alpha(B_{s'})^T H E_{b_{s'}} H^{-1} \right]_{b_{s'}} \left[ H E_{b_{s''}} H^{-1} \right]_{b_{s'} b_{s''}} \right] -$$

$$\sum_{\substack{y_{s'} \in Y_{s'} \\ y_{s''} \in Y_{s''}}} \sum_{\substack{B_{s'} \\ B_{s''}}} T(y_{s'}) T(y_{s''}) P(Y_{s'} = y_{s'}, Y_{s''} = y_{s''} \mid E_{1:s}, Y_{1:s}) \times$$

$$\left[ \sum_{\substack{B_{s'} \\ B_{s''}}} \alpha(B_{s'})^T \gamma_{b_{s'}}^{s'} \left[ H E_{b_{s'}} H^{-1} \right]_{b_{s'}} \alpha(B_{s''})^T \gamma_{b_{s''}}^{s''} \left[ H E_{b_{s''}} H^{-1} \right]_{b_{s''}} \right],$$

where $$\gamma_{b_{s'}}^{s'}$$

is a vector of eigenvalues of the matrix form for $P(B_{s'} \mid B_{s'-1}, E_{s'})$, H is a matrix of the corresponding eigenvectors, and $E_{b_{s'}}$ is a matrix with 1 in the $b_{s'}$, $b_{s'}^{th}$ place, and 0 elsewhere.

Finally, for $$VAR\left( \overline{T}_{m,p}^{end}(s) \right) = \sum_{s'=s+1}^{S_p} VAR\left( T^{prod}(Y_{s'}) \right)$$

the variance is obtained using the standard definition, as $$VAR\left( \overline{T}_{m,p}^{prod}(Y_{s'}) \right) = E\left( \left( \overline{T}_{m,p}^{end'}(s) \right)^2 \right) + \overline{T}_{m,p}^{end'}(s)^2 = \tag{22}$$

$$\sum_{y_{s'} \in Y_{s'}} \left( T^{prod}(Y_{s'}) \sum_{B_{s'}} P(Y_{s'} \mid B_{s'}) \alpha(B_{s'}) \right) 2 +$$

$$\left( \sum_{y_{s'} \in Y_{s'}} T^{prod}(Y_{s'}) \sum_{B_{s'}} P(Y_{s'} \mid B_{s'}) \alpha(B_{s'}) \right)^2.$$

Using the estimates given in equations (13) and (22), there can be developed a framework to perform continuous re-planning of the schedule based on the expected end time and uncertainty of production tasks. To do so, there is first developed an ontology to describe the relative interaction between tasks. It can be noted that the task interaction ontology for an adaptive schedule is different from task types, as the interaction depends on the types as well as the relative adjacency of the tasks. For example, while flexible tasks may have different executed start and end times than initially planned, two flexible tasks immediately adjacent to each other must have a one-to-one correspondence in schedule delays of the first task. Conversely, two flexible tasks that have a gap in between execution may be shifted independently.

Firstly, cross-scheduled tasks are defined as tasks that have direct effects on different machines in the job. For example, a docking task is scheduled for both a service machine executing production tasks and a transport machine in a service machine—transport machine system. Formally, cross-scheduled tasks are defined as follows:

Definition 1. Tasks $I_{m,p}$ and $I_{m'p'}$ s.t. $m \neq m'$, are cross-scheduled if there exists implicit constraints that $$T_{m,p}^{start} = T_{m',p'}^{start}, \text{ and } T_{m,p}^{end} = T_{m',p'}^{end}$$

within the scheduling problem.

Next, we define tasks as loosely connected if there is a set of precedence constraints that connect them. Formally, this is given by Definition 2. Tasks $I_{m,p}$ and $I_{m'p'}$ s.t. $m \neq m'$, are loosely connected if there exists implicit constraints that $$T_{m,p}^{start} = T_{m',p'}^{start}.$$

We define coupled tasks as tasks whose corresponding relative start times and precedence must always remain the same within the schedule. Formally, we have $$\overline{T}_{m,p}^{start} = T_{m,p}^{start} \forall m \in M \quad \text{s.t. } I_{m,p} \in I^{fixed}. \tag{23}$$

Finally, we define tasks $I_{m,p}$ and $I_{m'p'}$ as adjacent if there exists implicit constraints that $$T_{m,p}^{start} = T_{m',p'}^{end}.$$

The previously developed Markov model can be tied to the re-planning of the linked tasks in this variant of the job-shop scheduling problem. This can be done utilizing an elasticity parameter for use in the cost function to be minimized. The goal of the minimization is to weight the perturbation of future tasks in an optimal manner to minimize the overall difference between the new schedule and the original schedule while respecting schedule constraints. This may be accomplished using the following cost function:

Minimize $$\sum_{m \in M, p \in P_m} k_{m,p} \left| \left( T_{m,p+1}^{start} - T_{m,p}^{end} \right) - \left( \overline{T}_{m,p+1}^{start} - \overline{T}_{m,p}^{end} \right) \right|^2 \tag{24}$$

where

-continued $$k_{m,p} = \sum_{p=1}^{P_m} \text{VAR}\left(\overline{T}_{m,p}^{end}(s)\right), \tag{25}$$

and $$\text{VAR}\left(\overline{T}_{m,p}^{end}(s)\right)$$

is calculated in equation (22).

The cost function of equation (24) is inspired by elasticity-based path planning work originally developed by others in the art and represents the elastic energy of the overall schedule. The key difference is that equation (24) minimizes the weighted gaps between the start of one task p and the beginning of the next task p+1 for all machines $m \in M$, while previous work seeks to minimize the difference in elasticity between maps and sensed landmarks.

From the above, a quadratic programming (QP) approach to combining a number of production tasks into an optimally delayed end-to-end schedule can be presented. The elastic scheduling problem can be written as follows:

Minimize $$\sum_{m \in M, p \in P_m} k_{m,p} \left| \left( T_{m,p+1}^{start} - T_{m,p}^{end} \right) - \left( \overline{T}_{m,p+1}^{start} - \overline{T}_{m,p}^{end} \right) \right|^2 \tag{26a}$$

Subject to $$\forall a \in M_s, p \in P \tag{26b}$$

$$k_{m,p} = \sum_{p=1}^{P_m} \text{VAR}\left(\overline{T}_{m,p}^{end}(s)\right)$$

$$\forall a \in M_s, p \in P \tag{26c}$$

$$\overline{T}_{m,p}^{start} \leq \overline{T}_{m,p+1}^{start}$$

$$\forall a \in M_s, p \in P \text{ s.t.} \tag{26d}$$

$$I_{m,p} \in I^{fixed} \Rightarrow \overline{T}_{m,p}^{start} = T_{m,p}^{start}$$

$$\forall a \in M_s, p \in P \text{ s.t.} \tag{26e}$$

$$\langle I_{m,p}, I_{m',p'} \rangle \in I^{cross} \Rightarrow \overline{T}_{m,p}^{start} = \overline{T}_{m',p'}^{start}$$

$$\forall a \in M_s, p \in P \text{ s.t.} \tag{26f}$$

$$\overline{T}_{m,p}^{end} = \overline{T}_{m,p}^{start} + \hat{T}^{prod}(Y_{s''})$$

The constraints (26a) and (26b) define the cost function and elasticity weights, respectively, as also shown in equations (24) and (25). Constraint (26c) enforces precedence between task schedules. Constraint (26d) enforces that fixed tasks are scheduled at their original start time. The constraint (26e) enforces that if two tasks $I_{m,p}$ and $I_{m'P'}$ are cross scheduled, their start times must occur concurrently. Finally, (26f) enforces the end time of production tasks occur at the current expected production time based on the current timestep's estimate from (13).

The above QP may be implemented within one of the programming languages known in the art. Due to the specific construction of the objective function and constraints, the above elastic scheduling problem can be solved in polynomial time due to, first, the lack of binary variables and second, the quadratic component of the cost function (26a)

is positive semi-definite when in matrix form. This quadratic property is formally proven in the following proposition.

Without loss of generality, let there exist M machines and $P_m$ tasks for each machine m. Expanding (26a), let C be the terms containing an optimization variable $$\left( \overline{T}_{m,p}^{start}, \overline{T}_{m,p}^{end} \right).$$

Thus, $$C = \left| k_{m_n, P_n} \left( \overline{T}_{M,P_M}^{start} \right)^2 - 2k_{m,P_m} \left( \overline{T}_{m,P_m}^{start} \right) \left( \overline{T}_{m_n,P_n-1}^{end} \right) + k_{m,P_m} \left( \overline{T}_{m,P_m-1}^{end} \right)^2 + \right. \quad (27)$$

$$\cdots + k_{1,1} \left( \overline{T}_{1,2}^{start} \right)^2 - 2k_{1,1} \left( \overline{T}_{1,2}^{start} \right) \left( \overline{T}_{1,1}^{end} \right) + k_{1,1} \left( \overline{T}_{1,1}^{end} \right)^2 -$$

$$2k_{m,P_m} \left( T_{m,P_m}^{start} - T_{m,P_m-1}^{end} \right) \overline{T}_{m,P_m}^{start} - \cdots - 2k_{1,1} \left( T_{1,2}^{start} - T_{1,1}^{end} \right) \overline{T}_{1,2}^{start} +$$

$$\left. 2k_{m,P_m} \left( T_{m,P_m}^{start} - T_{m_n,P_n-1}^{end} \right) \overline{T}_{m_n P_n-1}^{end} + \cdots + 2k_{1,1} \left( T_{1,2}^{start} - T_{1,1}^{end} \right) \overline{T}_{1,1}^{end} \right|$$

C can be rewritten in quadratic form as $$C = \begin{bmatrix} \overline{T}_{m,P_m} & \cdots & \overline{T}_{1,1} \end{bmatrix} \begin{bmatrix} K_{m,P_m} & & 0 \\ 0 & \ddots & 0 \\ 0 & 0 & K_{1,1} \end{bmatrix} \begin{bmatrix} \overline{T}_{m,P_m} \\ \vdots \\ \overline{T}_{1,1} \end{bmatrix} + \quad (28)$$

$$\begin{bmatrix} -2k_{m,P_n} \left( T_{m,P_n}^{start} - T_{m,P_n1}^{end} \right) \\ 2k_{m,P_n} \left( T_{m,P_n}^{start} - T_{m,P_n1}^{end} \right) \\ \vdots \\ -2k_{1,1} \left( T_{1,2}^{start} - T_{1,1}^{end} \right) \\ 2k_{1,1} \left( T_{1,2}^{start} - T_{1,1}^{end} \right) \end{bmatrix}^\top \begin{bmatrix} \overline{T}_{m,Pa} \\ \vdots \\ \overline{T}_{1,1} \end{bmatrix} = \overline{T}^\top Q \overline{T} + c^\top \overline{T} +$$

for all $K_{m,p}$ and $\overline{T}_{m,P}$, p=1, . . . , $P_m$ and m=1, . . . , M, where $$K_{m,p} = \begin{bmatrix} k_{m,P_m} & -k_{m,P_m} \\ -k_{m,P_m} & k_{m,P_m} \end{bmatrix} \quad (29)$$

and $$\overline{T}_{m,p} = \begin{bmatrix} T_{m,p+1}^{start} \\ \overline{T}_{m,p}^{end} \end{bmatrix} \quad (30)$$

It can clearly be seen that Q is a block-diagonal matrix and thus the eigenvalues of Q are the eigenvalues of those of the block matrices $K_m,p \forall m \in M$, $p \in P_m$ Computing the eigenvalues of $K_m,P$, we have $$\lambda_{K_{m,p}} = \{2k_{m,p}, 0\} \quad (31)$$

Due to constraint (27b), $k_{m,p} \geq 0 \forall m \in M$, $p \in P_m$, and thus Q is positive-semidefinite. Thus, it is shown that the elastic scheduling problem described above can be solved in polynomial time.

Figure 3:
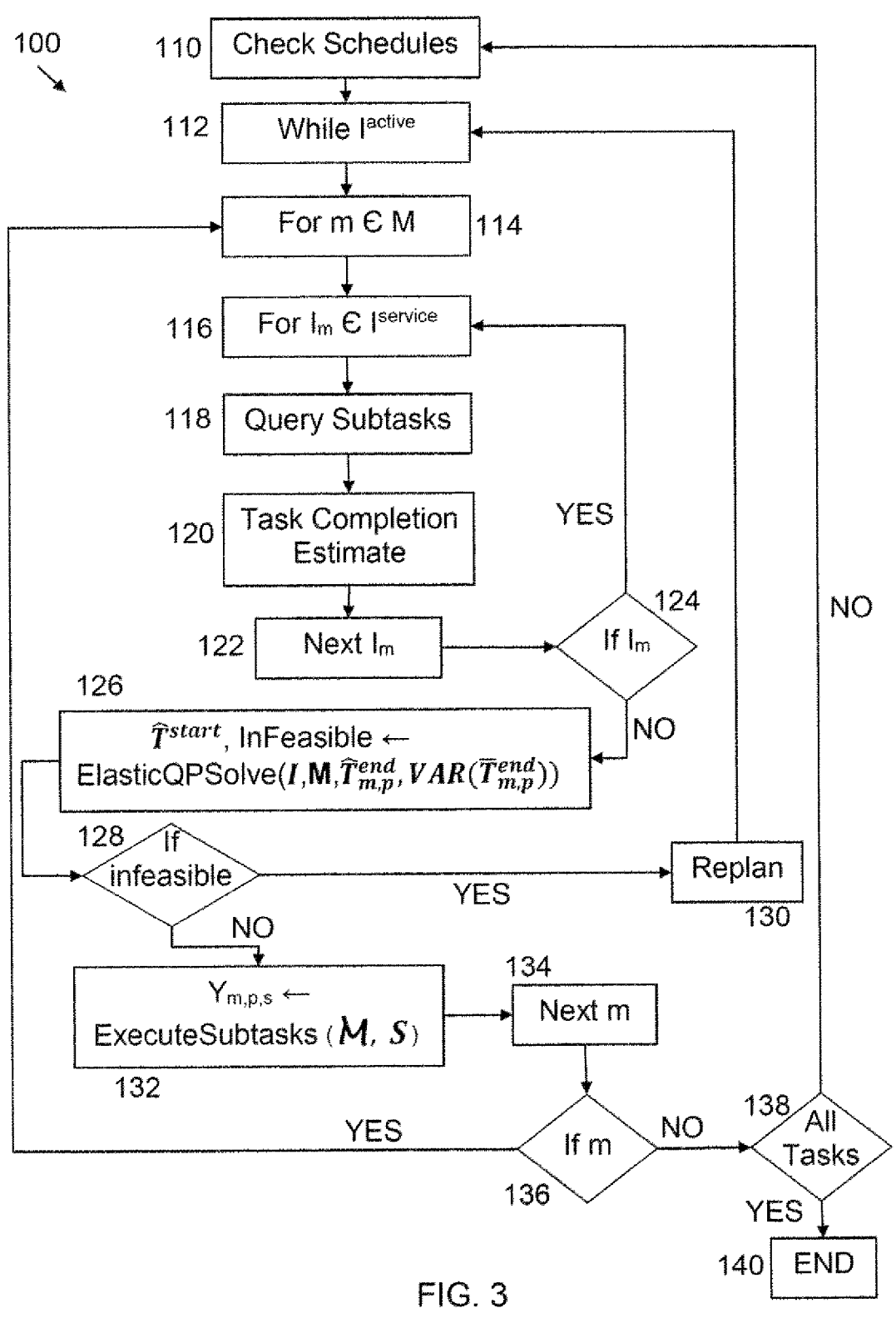
FIG. 3 illustrates a schematic block diagram of a method for reconfiguring the timing of tasks in a job queue based on expected estimated delays.

Referring now to FIG. 3, there is shown a block diagram of method 100 for task completion time estimation. Method 100 utilizes a full iterative elastic scheduler combining the polynomial-time solvable quadratic program found in the above elastic scheduling problem with the hidden Markov model. Method 100 may be implemented to efficiently estimate and re-plan an initial schedule when the precise time required for the various tasks in the job is unknown beforehand.

Method 100 begins at block 110, when a decision is made to determine if schedules are to be checked. Generally, the schedules may be checked at periodic intervals over the course of completion of the entire job. Alternately, block 110 may begin a loop, which checks schedules as the job progresses. Block 112 begins a loop through active tasks, $\exists I^{active}$ Block 114 begins a loop though all machines M and block 116 begins a loop through the tasks of those machines that are in service, $$I_{m,p} \in I_m^{service}.$$

Block 118 queries the subtasks for each machine and block 120 obtains the task completion estimate for the subtasks from those machines returning subtasks at block 118. Block 122 increments $I_{m,p}$, with block 124 testing if any further tasks remain. If yes, method 100 returns to block 116 to continue the loop through tasks $I_{m,p}$. If not, block 126 executes the elastic scheduling program, $\hat{T}_{start}$,InFeasible←ElasticQPSolve $$\left( I, M, \overline{T}_{m,p}^{end}, \text{VAR} \left( \overline{T}_{m,p}^{end} \right) \right),$$

as found in equations (26a) through (26f) and as shown solvable in equations (28) through (30) to determine if the adjusted schedules are feasible.

Finding the adjusted schedules are infeasible, as tested at block 128, results in triggering a full replan at block 130, then method 100 returns to block 112 to again begin the loop through active tasks $\exists I^{active}$. If block 128 determines the adjusted schedules are feasible (or not infeasible), the machines execute current tasking at block 132.

Block 134 increments m, with block 136 testing if any further machines remain. If yes, method 100 returns to block 114 to continue the loop through machines m. If not, block 138 checks if the total job is complete. If some tasks remain, method 100 returns to block 110 to check further schedules. Method 100 ends at block 140 when the total job is complete.

Referring now to FIG. 4, there is shown pseudo code representation 200 of method 100. Lines 1 through 4 of pseudo code 200 set up the loops as described in method 100. In pseudo code 200, line 5 queries the subtasks for each machine, as in block 118 of method 100 in FIG. 3. Line 6 of pseudo code 200 obtains the task completion estimate for the subtasks from the machines returning subtasks, as in block 120 of method 100. In obtaining the task completion estimates for the subtasks, both line 6 of pseudo code 200 and block 120 of method 100 utilize equation 13 for the calculation of the expectation of the in situ endtime for each task and equations 16, 21 and 22 for the calculation of the transient variance of each endtime. Line 7 of pseudo code 200 executes the elastic scheduling quadratic problem, as in block 126 of method 100. Line 8 checks if the elastic schedule was found to be infeasible, and if so, triggers a full replan, as in block 128 and block 130, respectively, of method 100. At line 9, the machines execute current tasking, as in block 132 of method 100. Finally, line 10 of pseudo code 200 continues the loop until all tasks are completed.

What has thus been described are methods and systems for evaluating and replanning schedules for a set of machines that have been allocated tasks under a pre-defined but estimated schedule based on initial knowledge of the jobs and desired outcome. As tasks are being completed, various machines within the set may experience delays adversely impacting the estimated schedule.

A Hidden Markov Model (HMM) is developed to describe the evolution of observable schedule delays that depend on internal factors, such as material imperfections, environment, or job difficulty, which are not directly observable. This Hidden Markov Model can then be used to propagate updated task estimates based on then-current data for each task (block 120 of FIG. 3). An algorithm (method 100 of FIG. 3 and pseudo code 200 of FIG. 4) based on quadratic-programming-based elastic re-scheduling (block 126 of FIG. 3) utilizes the updated estimates to quickly and efficiently re-plan overall job schedules.

Thus, method 100 and pseudo code 200 fill the need in the art to determine when and how to re-plan and re-task machines that have some degree of autonomy in the face of constantly changing conditions. This can be accomplished using the HMM to learn the delays that occur in the planned schedule. Method 100 and pseudo code 200 are generalized such that scenarios where tasks are not periodic can be handled. Elasticity is incorporated so as to determine a reconfiguration of the timing of tasks in the job queue based on their expected HMM estimate.

Obviously, many modifications and variations of the present invention may become apparent in light of the above teachings. For example, the configuration of blocks in method 100 can be changed to suit processing capabilities used in executing method 100 or pseudo code 200. As previously described herein, method 100 may be executed periodically throughout the course of the job, or alternately may be executed as a loop continuously checking on and updating schedules as the job progresses.

It will be understood that many additional changes in details and steps which have been described herein and illustrated in order to explain the nature of the invention, may be made by those skilled in the art within the principle and scope of the invention as expressed in the appended claims.

What is claimed is:

1. A method of evaluating and replanning schedules for a set of machines, $^M$, that have been allocated tasks under a pre-defined but estimated original schedule based on initial knowledge of the tasks and desired outcome, said method comprising:

developing a Hidden Markov Model (HMM) describing evolution of observable schedule delays dependent on factors not directly observable;

propagating updated task estimates for each task based on using said HMM and then-current data; and applying a quadratic programming (QP) approach to combine said updated task estimates into an optimally delayed end-to-end schedule;

wherein propagating said updated task estimates comprises:

obtaining fixed task type starttimes and endtimes, wherein each said fixed task type maintains an original schedule starttime and endtime;

obtaining flexible task type starttimes and endtimes, wherein a duration of each said flexible task type is a constant and a starttime of each said flexible task type is dependent on an endtime of a preceding task, and obtaining production task type start times and endtimes, wherein each production task type is divided into a finite number of subtasks and each of said subtasks is executed in one of a finite number of modes based on sensed characteristics of an area wherein each said subtask is executed;

wherein developing said Hidden Markov Model comprises:

developing a first calculation for the expectation of the mean endtime for each said production task, $$\hat{T}^{end}_{m,p}(s),$$

where m is an index of an $m^{th}$ machine in said set of an machines, p is an index of a $p^{th}$ task of said $m^{th}$ machine, and S is an index of a $S^{th}$ subtask of said $p^{th}$ task; and developing a second calculation for the transient variance of each executed endtime of each of said production tasks, $$VAS(\overline{T}^{end}_{m,p}).$$

2. The method of claim 1, wherein said quadratic programming approach comprises: developing an ontology describing relative interactions between tasks; and minimizing an overall difference between a replanned schedule and said original schedule by weighting a perturbation of future tasks, while respecting constraints inherent in said ontology.

3. The method of claim 2, wherein said interactions comprise:

interactions with said fixed tasks, wherein said fixed tasks are constrained to maintain an original schedule start time during replanning;

interactions with cross-scheduled tasks, wherein said cross-scheduled tasks are constrained to have a same start time and a same end time;

interactions with loosely connected tasks, wherein there exist implicit constraints that a start time of a first of said loosely connected tasks is at least one of before and equal to a start time of a second one of said loosely connected tasks;

interactions with coupled tasks, wherein corresponding relative start times and precedence remain the same within a schedule; and interactions with adjacent tasks, wherein there exist implicit constraints a start time of a following one of said adjacent tasks is an end time of a preceding one of said adjacent tasks.

4. The method of claim 3, wherein said quadratic programming approach further comprises constraining said executed endtimes of said production tasks to occur at a current expected production time based on said first and second calculations for said production tasks.

5. The method of claim 1, wherein said quadratic programming approach comprises:

developing an ontology describing relative interactions between tasks; and minimizing an overall difference between a replanned schedule and said original schedule by weighting a perturbation of future tasks, while respecting constraints inherent is said ontology.

6. The method of claim 5, wherein said interactions comprise:

interactions with fixed tasks, wherein said fixed tasks are constrained to maintain an original schedule start time and endtime during replanning;

interactions with cross-scheduled tasks, wherein said cross-scheduled tasks are constrained to have a same start time and a same endtime;

interactions with loosely connected tasks, wherein there exist implicit constraints that a start time of a first of said loosely connected tasks is at least one of before and equal to a start time of a second one of said loosely connected tasks;

interactions with coupled tasks, wherein corresponding relative start times and precedence remain the same within a schedule; and interactions with adjacent tasks, wherein there exist implicit constraints that a start time of a following one of said adjacent tasks is an end time of a preceding one of said adjacent tasks.

7. The method of claim 6, wherein said quadratic programming approach further comprises constraining endtimes of production tasks to occur at a current expected production time based on said updated task estimates for said production tasks, wherein each production task is divided into a finite number of subtasks and each of said subtasks is executed in one of a finite number of modes based on sensed characteristics of an area wherein each said subtask is executed.

8. A method of evaluating and replanning schedules for a set of machines, $^{M}$, that have been allocated tasks under a pre-defined but estimated original schedule based on initial knowledge of the tasks and desired outcome, said method comprising:

developing a Hidden Markov Model (HMM) describing evolution of observable schedule delays dependent on factors not directly observable;

propagating updated task estimates for each task based on using said HMM and then-current data; and applying a quadratic programming (QP) approach to combine said updated task completion estimates and constraints into an optimally delayed end-to-end schedule;

wherein propagating said updated task estimates comprises:

obtaining fixed task type start times and end times, wherein each said fixed task type maintains an original schedule start time and endtime;

obtaining flexible task type start times and end times, wherein a duration of each said flexible task type is a constant and a start time of each said flexible task type is dependent on an endtime of a preceding task; and obtaining production task type start times and end times, wherein each production task type is divided into a finite number of subtasks and each of said subtasks is executed in one of a finite number of modes based on sensed characteristics of an area wherein each said subtask is executed;

wherein developing said Hidden Markov Model comprises:

developing a first calculation for the expectation of the mean endtime for each said production task $$\hat{T}^{end}_{m,p}(s)$$

where m is an index of an $m^{th}$ machine in said set of machines, P is an index of a $p^{th}$ task of said $m^{th}$ machine, and S is an index of a $S^{th}$ subtask of said $p^{th}$ task; and developing a second calculation for the transient variance of each executed endtime of each of said production tasks, $$VAR(\overline{T}^{end}_{m,p}).$$

9. The method of claim 8, wherein applying a quadratic programming approach comprises:

applying elasticity parameters to said updated task completion estimates; and optimally weighting a perturbation of future tasks based on said elasticity parameters.

10. The method of claim 9, wherein said weighting comprises obtaining a transient variance of each said estimated endtime, $$VAR\big(T^{end}_{m,p}(s)\big),$$

where m is an index of an $m^{th}$ machine in said set of machines, p is an index of a $p^{th}$ task of a set P tasks of said $m^{th}$ machine, and S is an index of a $s^{th}$ subtask of said $p^{th}$ task.

11. The method of claim 10, wherein said constraints comprise:

enforcing precedence between task schedules;

enforcing fixed tasks be scheduled at start times consistent with said original schedule; and enforcing cross-scheduled tasks be scheduled with a same start time and a same end time.

12. The method of claim 11, wherein obtaining an updated task completion estimated endtime comprises obtaining production task start times and endtimes, wherein each production task is divided into a finite number of subtasks and each of said subtasks is executed in one of a finite number of modes based on sensed characteristics of an area wherein each said subtask is executed.

13. The method of claim 12, wherein said constraints further comprise enforcing endtimes of production tasks occur at a current expected production time based on said updated task estimates for said production tasks.

14. The method of claim 13, wherein said optimally delayed schedule minimizes a cost function $$\sum_{m\in M, p\in P_m} k_{m,p}\big[\big(T^{start}_{m,p+1} - T^{end}_{m,p}\big) - \big(T^{start}_{m,p+1} - T^{end}_{m,p}\big)\big]^2,$$

wherein $k_{m,p}$ is a summation of said transient variances over the set P, $$T^{start}_{m,p+1}$$

signifies an original start time of a task, p+1 of machine m, $$T^{end}_{m,p}$$

signifies an original end time of a task, p of machine m, $$T_{m,p+1}^{start}$$

5 signifies an expected start time of task p+1 and $$T_{m,p}^{end}$$

10 signifies an expected end time of task p.

15. The method of claim 14, further comprising determining if said optimally delayed end-to-end schedule is found to be infeasible in view of said constraints.

16. The method of claim 15, further comprising replanning said updating of task schedules when said end-to-end schedule is found to be infeasible.

17. The method of claim 8, further comprising determining if said optimally delayed end-to-end schedule is found to be infeasible in view of said constraints.

18. The method of claim 17, further comprising replanning said updating of task schedules when said end-to-end schedule is found to be infeasible.

\* \* \* \* \*